(12) United States Patent
Okur et al.

(10) Patent No.: US 11,850,498 B2
(45) Date of Patent: Dec. 26, 2023

(54) KINEMATIC ANALYSIS OF USER FORM

(71) Applicant: RAPSODO PTE. LTD., Singapore (SG)

(72) Inventors: Batuhan Okur, Singapore (SG); Boyi Zhang, Singapore (SG)

(73) Assignee: RAPSODO PTE. LTD., Singapore (SG)

( * ) Notice: Subject to any disclaimer, the term of this patent is extended or adjusted under 35 U.S.C. 154(b) by 146 days.

(21) Appl. No.: 16/714,548

(22) Filed: Dec. 13, 2019

(65) Prior Publication Data

US 2021/0178244 A1 Jun. 17, 2021

(51) Int. Cl.
| | |
|---|---|
| A63B 71/06 | (2006.01) |
| G09B 19/00 | (2006.01) |
| A63B 24/00 | (2006.01) |
| A63B 102/32 | (2015.01) |

(52) U.S. Cl.
CPC ...... *A63B 71/0622* (2013.01); *A63B 24/0006* (2013.01); *G09B 19/0038* (2013.01); *A63B 2024/0015* (2013.01); *A63B 2024/0068* (2013.01); *A63B 2071/0647* (2013.01); *A63B 2071/0694* (2013.01); *A63B 2102/32* (2015.10); *A63B 2220/05* (2013.01); *A63B 2220/803* (2013.01); *A63B 2220/806* (2013.01); *A63B 2220/807* (2013.01); *A63B 2220/89* (2013.01); *A63B 2225/50* (2013.01)

(58) Field of Classification Search
CPC ............ A63B 71/0622; A63B 24/0006; A63B 2220/05; A63B 2220/806; A63B 2220/807; A63B 2024/0068; A63B 2071/0694; A63B 2225/50; A63B 2220/803; A63B 2102/32; A63B 2071/0647; A63B 2024/0015; A63B 2220/89; G09B 19/0038

See application file for complete search history.

(56) References Cited

U.S. PATENT DOCUMENTS

| | | | | |
|---|---|---|---|---|
| 5,868,578 | A * | 2/1999 | Baum | A63B 24/0021 434/257 |
| 7,840,031 | B2 * | 11/2010 | Albertson | A63B 24/0003 382/103 |
| 8,622,795 | B2 * | 1/2014 | Edis | A63F 13/816 36/39 |

(Continued)

FOREIGN PATENT DOCUMENTS

WO  WO-2008023250 A1 *  2/2008  ......... A63B 24/0003

*Primary Examiner* — Jeffrey S Vanderveen
(74) *Attorney, Agent, or Firm* — Maschoff Brennan

(57) ABSTRACT

A method includes receiving motion data of a user in an environment with respect to a plurality of instances of a first action by the user, determining a kinematic movement based on receiving the motion data, analyzing the kinematic movement using a neural network, obtaining a plurality of outcome types with respect to the first action of the user, correlating the kinematic movement with the at least one indication of the outcome type with respect to the first action, classifying an outcome of the first action as at least one of the plurality of outcome types, determining which of the kinematic movements of the user result in the at least one of the plurality of outcome types, and providing instructions to the user to alter the determined kinematic movements of the user that result in the at least one of the plurality of outcome types.

20 Claims, 4 Drawing Sheets

(56) References Cited

U.S. PATENT DOCUMENTS

| | | | |
|---|---|---|---|
| 9,314,190 B1* | 4/2016 | Giuffrida | A61M 5/1723 |
| 9,974,478 B1* | 5/2018 | Brokaw | A61B 5/486 |
| 10,149,958 B1* | 12/2018 | Tran | G16H 50/20 |
| 10,503,965 B2* | 12/2019 | Smith | G06Q 20/18 |
| 10,695,611 B2* | 6/2020 | Starkey | A63B 24/0075 |
| 2006/0190419 A1* | 8/2006 | Bunn | G06V 20/52 |
| | | | 706/2 |
| 2010/0191100 A1* | 7/2010 | Anderson | G06T 7/246 |
| | | | 600/424 |
| 2014/0201666 A1* | 7/2014 | Bedikian | G06V 40/20 |
| | | | 715/771 |
| 2017/0027501 A1* | 2/2017 | Senanayake | A61B 5/1128 |
| 2018/0288586 A1* | 10/2018 | Tran | H04Q 9/00 |
| 2018/0374383 A1* | 12/2018 | Thielen | G06T 19/006 |
| 2019/0122410 A1* | 4/2019 | Chamdani | G16H 20/30 |
| 2019/0258905 A1* | 8/2019 | Rankin | G09B 19/0038 |
| 2020/0005544 A1* | 1/2020 | Kim | G06T 13/40 |
| 2020/0037942 A1* | 2/2020 | Howard | A61B 5/4088 |
| 2020/0060566 A1* | 2/2020 | Howard | A61B 5/4824 |
| 2020/0222757 A1* | 7/2020 | Yang | G06V 40/23 |

* cited by examiner

KINEMATIC ANALYSIS OF USER FORM

FIELD

The application relates generally to kinematic analysis of user form.

BACKGROUND

A person may engage in an activity that launches an object along a trajectory through the person's own physical movements, such as hitting a golf ball, kicking a soccer ball, hitting a baseball, and the like. The person may desire a way determine whether the trajectory of the object was a "good shot" or a "bad shot," as well as desire a way to determine what physical movements are used to create a "good shot" or a "bad shot."

The subject matter claimed herein is not limited to embodiments that solve any disadvantages or that operate only in environments such as those described above. Rather, this background is only provided to illustrate one example technology area where some embodiments described herein may be practiced.

SUMMARY

Embodiments of the disclosure discuss various operations performed in a method, system, and/or computer-readable medium. In an example, a method includes receiving motion data of a user in an environment with respect to a plurality of instances of a first action by the user, determining a kinematic movement based on receiving the motion data, analyzing the kinematic movement using a neural network, obtaining a plurality of outcome types with respect to the first action of the user, correlating the kinematic movement with the at least one indication of the outcome type with respect to the first action, classifying an outcome of the first action as at least one of the plurality of outcome types, determining which of the kinematic movements of the user result in the at least one of the plurality of outcome types, and providing instructions to the user to alter the determined kinematic movements of the user that result in the at least one of the plurality of outcome types.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
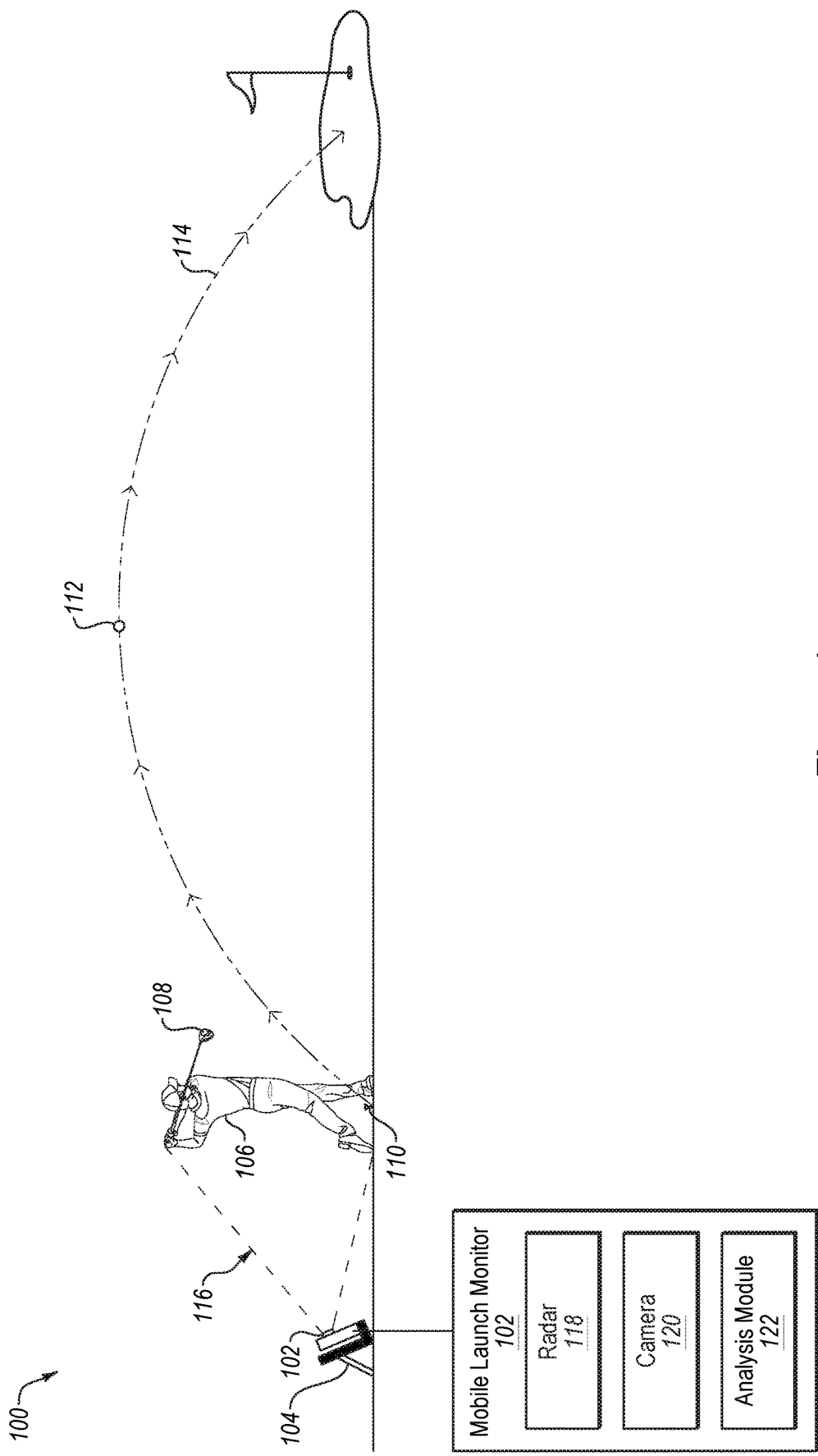
FIG. 1 illustrates an example environment to provide a kinematic analysis of user form.

Many technologies and fields may benefit from imaging analysis. For example, in sports, imaging analysis may help identify whether a player of a sport or a game makes contact with a ball or other object, and whether the output of that contact results in a "good" hit or a "bad" hit. Additionally, imaging analysis and/or other sensor detection may be used in real-time processes. For example, high speed cameras may illustrate as an event occurs and sometimes in seemingly slow-motion: a quick swinging motion such as that of a golf club, a baseball bat, or a tennis racket. In other scenarios, radar sensors may be used to determine a speed of an object as an event occurs, e.g., a baseball pitch, a tennis serve, a tee-shot, etc. Additionally, imaging analysis and/or other sensor detection may be used in predictive processes. Such predictive processes may be difficult and/or computationally intense because in addition to accurately gathering real-time data, simulated data may be generated based on the real-time data. Thus, in some conventional methods and systems, predicting or analyzing the motion of a person while playing a sport (e.g., a player) in order to analyze the movement of the person (e.g., the input) with respect the motion of the object (e.g., the output) may be unduly limited or unreliable. Smartphone hardware, low-cost hardware, and/or slow frame rate speeds of some cameras may further exacerbate the example problematic limitations and reliability of other methods and systems.

Aspects of the present disclosure address these and other problems with conventional methods and systems by providing a new, software-based deep learning approach that captures data associated with the movement of a player, and analyzes the motion data in conjunction with the trajectory of an object in order to determine whether the player's movement correlates with a "good" hit or a "bad" hit (or something in between). By correlating a player's movements with a specific outcome, the player can receive feedback on how to adjust his movements in order to improve the outcome of the hit.

In one embodiment, the player may make contact with a physical object in order to launch the object along a trajectory. The contact with the object may be between a body part of the player himself (e.g., kicking a soccer ball with the player's foot or throwing a baseball with the player's hand) or the contact with the object may be using a tool wielded by the player (e.g., hitting a golf ball with a golf club or hitting a baseball with a baseball bat). In one embodiment, the object may be stationary at the time the player makes contact with the ball (e.g., a golf ball on a tee), or the object may be moving along a path on which the player is able to make contact with the moving object (e.g., a baseball pitch towards the player batting, a tennis ball, etc.).

For purposes of clarity and brevity, the remainder of the description will be provided in the context of a player hitting a golf ball with a golf club; however, it is understood that the methods and systems described herein may be applied to any embodiment in which a player makes either direct or indirect contact with an object to move the object along a trajectory into three-dimensional space.

In the embodiment where a player hits a golf ball with a golf club, each hit may be considered a "good" hit, a "bad" hit, or somewhere in between. For example, a "good" hit may be a drive that results in the golf ball traveling a long distance. In another example, a "good" hit may be a hit that has a high level of accuracy, such as a hit that lands closest to an intended target (e.g., nearest the hole, onto the "green," etc.). A "bad" hit may be a hit that veers off course, does not travel as far as expected, etc. A player that wishes to maintain a "good" outcome or wishes to improve on a "bad" outcome, may desire a method and system that provides an analysis on a number of previous hits performed by the player in order to determine the specific elements of physical movement that create a "good" hit or a "bad" hit. The analysis, therefore, may result in differentiating the kinematic difference between a "good" hit and a "bad" hit and thus used to provide feedback to the player.

Thus, according to one or more embodiments of the present disclosure, a device may be placed behind a player to acquire imaging data associated with the skeletal movement of a player, as well as potentially obtain flight parameters of a launched object (e.g., a golf ball) such as speed, spin axis, rate of spin, launch angle, launch direction, etc. Additionally or alternatively, radar data may be used to deduce one or more of the motion parameters of either the player or the object. Although each hit may have minute differences in physical motion of the player, the player is more likely to have at least one repeated movement which is causing a good or a bad outcome. Thus, by comparing the data obtained over time, a player's movements may be compared to other movements made by himself in order to make adjustments. Thus, one of more of the motion parameters of either the player or the object may be input into a deep learning analysis module, the output of which provides the player with feedback in order to improve his game.

FIG. 1 illustrates an example environment 100 to provide a kinematic analysis of user form, where a kinematic analysis may describe an analysis of the motion of points and objects, such as skeletal and joint motion of a human. The example environment 100 is arranged in accordance with at least one embodiment of the present disclosure. As illustrated, the environment 100 may include an image and radar data capture device 102 (hereinafter "a mobile launch monitor" or "MLM" 102), a stand 104 to hold the MLM 102 in a stable and unmoving position, a player 106, an object 112 (e.g., a golf ball 112), and a trajectory 114 of the object 112. In one embodiment, the MLM 102 may have a field of view 116 that captures images and radar data of the player 106. In some embodiments, the field of view 116 may be a three-dimensional space in which the radar 118 and the camera 120 (e.g., in video mode or picture mode), sense indications of events, and/or obtain data and where the data obtained by the radar 118 and the camera 120 are communicated to an analysis module 122. Although a radar 118 and a camera 120 are described, any data capture device and/or sensor may be contemplated, such as an infrared camera, a motion sensor, a light sensor, a microphone, or other sensor configured to sense changes in light, pixels, sound, motion, rotation, position, orientation, magnetization, acceleration, tilt, vibration, force, speed, color, wind, etc.

In one embodiment, the MLM 102 may be, but is not limited to, a mobile phone, a smart phone, a tablet computer, a portable computer, a desktop computer, a set-top box, a virtual-reality device, an augmented reality device, an electronic wearable device (e.g., a smartwatch), a video camera, a connected device, a measurement device, etc. In an additional or alternative embodiment, the MLM 102 may include a standalone computing device in communication with a sensor such as the radar 118 and the camera 120. In another additional or alternative embodiment, the MLM 102 may include a standalone computing device in communication with a standalone radar 118 and a standalone camera 120.

As illustrated in FIG. 1, in one embodiment, the MLM 102 may be placed behind the player 106 in a position on or near to the ground. For example, the MLM 102 may be placed approximately eight feet behind the back foot of the player 106, and placed on a stand 104 or another holder configured to position the MLM 102 in such a way that the camera and radar can capture data associated with movement of the player. In an additional or alternative embodiment, the MLM 102 may be placed on a tripod or other support structure to hold the MLM 102 in a steady position, and from which the camera and the radar may object movement data. Although the MLM 102 is described as being placed, for example, approximately eight feet behind the back foot of the player, the MLM 102 may be placed at any location in which the camera and the radar may capture data associated with the movement of the player.

In one embodiment, the MLM 102 may be angled upwards towards the player 106 in order to capture the entire body of the player. For example, the MLM 102 may be placed on the stand, where the stand 104 and the MLM 102 make an angle θ with respect to the ground where θ is approximately between 0 and 150 degrees, although other angles are possible. Regardless of the placement and the angle of the MLM 102 and/or the stand 104, the placement of the MLM 102, should be consistent between each data gathering session so as to provide consistent parameters from which an analysis may be determined.

The analysis module 122 may receive data from the radar 118 and the camera 120 and train a neural network using the received data during a training process (e.g., to populate one or more layers or neurons in the neural network). Additionally or alternatively, the analysis module 122 may use the data generated by the radar 118 and/or the camera 120 to learn post-training (e.g., to re-populate one or more layers or neurons in the neural network or to populate layers or neurons in response to changed circumstances in the environment 100). The neural network may include any learning-based mechanism. Examples of neural networks may include: perceptron, multilayer perceptron, feed forward, radial basis network, deep feed forward, recurrent neural network, long/short term memory, gated recurrent unit, auto encoder, variational auto encoder, denoising auto encoder, sparse auto encoder, any sequence-to-sequence model, shallow neural networks, markov chain, hopfield network, boltzmann machine, restricted boltzmann machine, deep belief network, deep convolutional network, convolutional neural network (e.g., VGG-16), deconvolutional network, deep convolutional inverse graphics network, modular neural network, generative adversarial network, liquid state machine, extreme learning machine, echo state network, recursive neural network, deep residual network, kohonen network, support vector machine, neural turning machine, etc.

For example, the radar 118 and/or the camera 120 may obtain data related to the capture of and measurement of the position, velocity, and acceleration of one or more body parts of the player 106. In particular, a kinematic analysis of the data obtained from the radar 118 and/or the camera 120 may include linear measurements of specific body parts and/or the angular measurement of joint, either individually or in combination.

In order to provide an efficient analysis and to provide feedback to the player on how his movements are affecting the outcome of the hit, the MLM 102 may be set up to capture a series of data gathering input events. Each input event may be a single swing; for example, each event may be a single swing of the golf club, a swing of a baseball bat, a swing of a tennis racket, a release of a bowling ball, a throw of a dart, etc. In an additional or alternative embodiment, each event may be more than one movement being part of a set of movements; for example, a set of movements that constitutes an event may include the player positing himself at the tee, planting his feet, gripping the club, and then swinging the golf club.

In an additional or alternative embodiment, a sensor may be attached to a portion of the player 106's body; for example, a low-cost sensor including accelerometers, gyroscopes, etc. may be attached to the player 106's hand, chest, waist, wrist, or some other body part which may be tracked to determine movement. The data from the sensor attached to the player 106 may be obtained as the player moves his body (e.g., data obtained from the motion of the club during a swing, the motion of a baseball bat during a swing, the motion of the body part itself). The motion data from the player 106 sensor may be fused with the radar 118 and/or camera 120 data to increase the accuracy related to the body motion perceived by the camera. Thus, in some or any of the embodiments, the data may be a combination of radar 118 data, camera 120 data, and/or data obtained from a sensor attached to the player 106.

In one embodiment, the analysis module 122 may train a neural network on approximately 50 input events before an analysis is provided to the player that indicates which specific movements the player makes correlate with specific outputs of the object. Although 50 input events is described, fewer or a greater number of input events may be analyzed by the analysis module 122 in order to produce a correlation.

Figure 2:
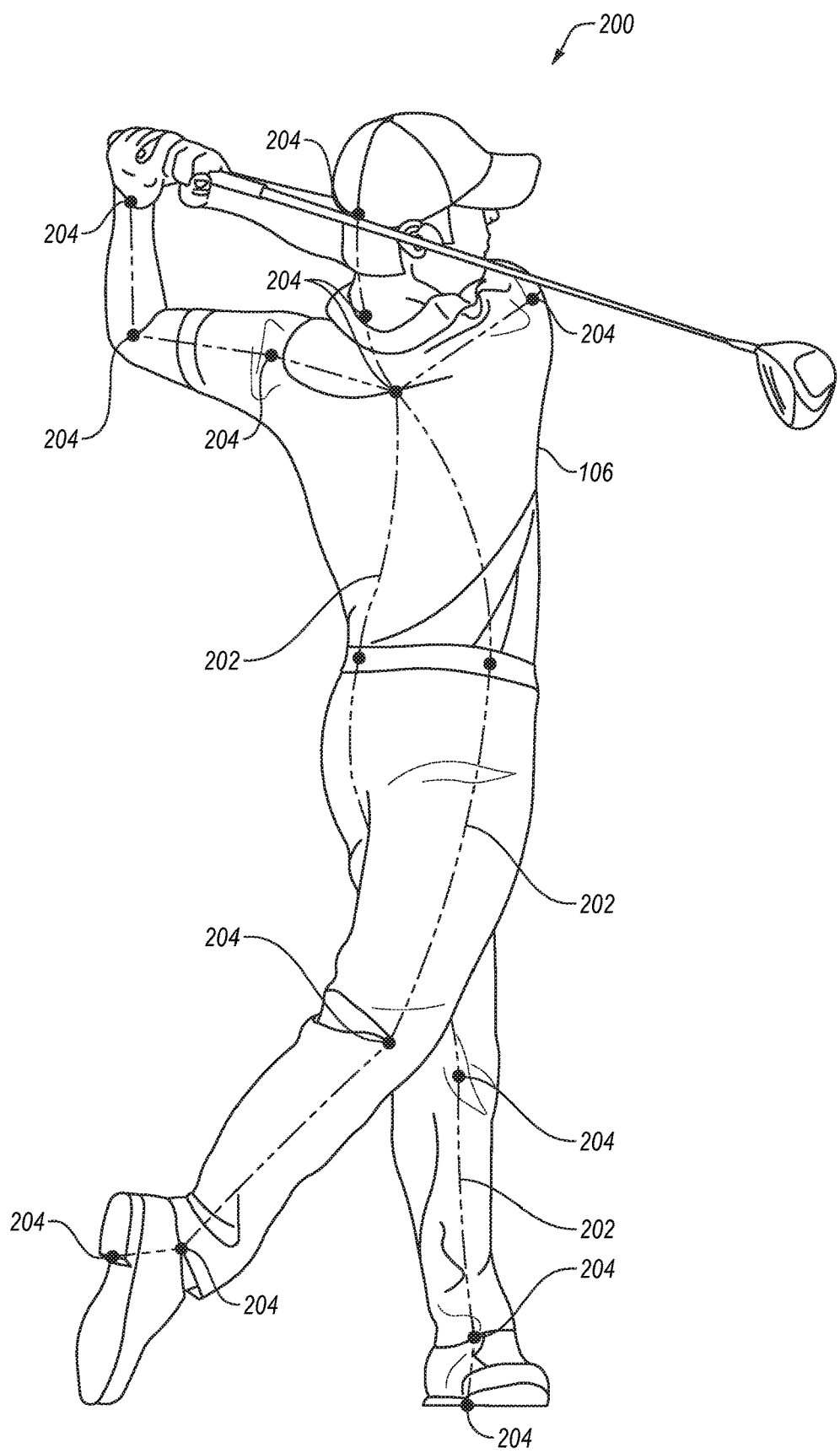
FIG. 2 illustrates an example skeletal and joint map of a user for use in providing a kinematic analysis of user form.

The kinematic analysis is provided in more detail with respect to FIG. 2. Modifications, additions, or omissions may be made to the environment 100 without departing from the scope of the present disclosure. For example, in some embodiments, the environment 100 may include any number of other components that may not be explicitly illustrated or described.

Moreover, the separation of various components in the embodiments described herein is not meant to indicate that the separation occurs in all embodiments. In addition, it may be understood with the benefit of this disclosure that the described components may be integrated together in a single component or separated into multiple components.

FIG. 2 illustrates an example skeletal and joint map 200 of a user for use in providing a kinematic analysis of user form. In particular, the map 200 may show a schematic of the player 106, where the player's skeletal structure is broken down into a number of body segments 202 and joints 204. As described above, therefore, the analysis module 122 may process data received from the radar 118 and camera 120 using, in one example, a neural network. Using a statistical analysis, it may be determined which of the specific inputs is determined to correlate with specific output, where the output may be classified as a "good" hit or a "bad" hit. For example, the analysis module 122 may determine that the player 106 is consistently leaning forward at the hip joints leaning forward past a certain angle when swinging the club 108. It may be further determined that each time the player 106 leans forward at the hip joints in such a way, the distance that the ball travels on a drive is fewer yards than when the player 106 is standing up straighter. In another example, the analysis module 122 may determine that when the player 106's right leg is rotating at the hip joint 204 within a certain rotational angle range, in combination with the player 106's knee joint 204 and ankle joint 204 rotating certain rotational angle ranges, respectively, the trajectory of the ball is more accurate with respect to an intended target.

In order to correlate what movements of the player 106 result in what type of output, the analysis module 122 is provided with knowledge as to what constitutes a "good" hit, a "bad" hit, and everything in between. In one embodiment, the classification of a hit being somewhere between a "good" hit and a "bad" may be pre-determined and stored in a database in memory. For example, if a player 106 is teeing off on a par 4 hole using a driver club 108, a "good" hit may be pre-determined to be a hit that launches the golf ball approximately 200 to 250 yards from the tee 110. In another example, if the player 106 launches the golf ball 112 such that the golf ball lands on the green in regulation, the associated hit would be pre-determined to be a "good." In contrast, if the player 106 is teeing off on the same par 4 using the driver club 108, a "bad" hit may be pre-determined to be a hit that launches the golf ball 112 less than 100 yards from the tee 110. In another example, if the player 106 hits the golf ball 112 into a water hazard, it may be pre-determined that such a hit is a "bad" hit. Thus, in some embodiments, data associated with different environments may be stored in memory and used during the analysis process; for example, the layout of different golf courses, including yardage, landscape, par data, the dimensions of a tennis court, the number of yards from home base to an outfield fence in different locations, etc., may be stored in memory and accessible by at least the MLM 102 or another computing device in communication with the MLM 102.

In some embodiments, the data received by the analysis module 122 may include motion data. The motion data may include radar data, motion sensor data, camera data and/or other suitable data configured to indicate motion. Visual or optical data obtained by the camera 120 may use a video recording system to capture range of motion of body segments and azimuth with respect to movement and rotation.

In one embodiment, the radar 118 may obtain radar track data associated with the movement of the player 106, and specifically with movement of the player's body segments and joints as shown in map 200. Radar data may include narrow band or wideband signals, where narrow band radar data may determine the player 106's movements based on the Doppler effect. If the radar 118 is an ultra-wide-band radar, the radar 118 may obtain data associated with body segment displacement and motion kinematics.

In one embodiment, the analysis module 122 may analyze the radar data in a myriad of ways. In one example way of analysis, a Fast Fourier transform (FFT) may be performed on the radar data, e.g., by the computing system 400 described with reference to FIG. 4. In these or other embodiments, the analysis may be performed on the radar data corresponding to a time around launch of the object 112. In an example analysis including an FFT, the FFT may include a Cooley-Tukey FFT, a Prime-factor FFT, a Bruun's FFT, a Rader's FFT, a Bluestein's FFT, a Goertzel algorithm, a Radix algorithm, a Fast Hartley Transform, a Quick Fourier Transform, a Decimation-in-Time-Frequency algorithm, a combination thereof, or any other suitable algorithm. Sample equations and examples of some types of FFT analysis are described in additional detail in the paper entitled FFT ALGORITHMS by Brian Gough dated May 1997 and archived at https://pdfs.semanticscholar.org/ca1c/a09567ef927c6b545af435f96e9e49ba43ee.pdf (hereafter the "Gough Paper"). The contents of the Gough Paper in its entirety are expressly incorporated by reference into the present disclosure.

In these or other embodiments, the analysis on the radar data may be used to determine a measured speed of the object 112. The measured speed of the object 112, in some cases, may include a fraction of the actual speed of the object 112 since the radar sensor may measure the portion of the speed of the object 112 in the radial direction of the radar 118, not the actual speed of the object 112 along its trajectory 114. The measured speed of the object 112 may be used to further determine whether a hit is a "good" hit or a "bad" hit in conjunction with the movements of the player 106.

In one embodiment, the camera 120 may obtain still and video images of the player 106 and/or the object 112. In one embodiment, upon receiving the motion data by the analysis module 122, the analysis module may analyze one or more images of the player 106 and/or the object 112 in an image buffer. The image buffer may be configured as data storage (e.g., as part of the computing system 400 described with reference to FIG. 4) that may receive data on a rolling basis and/or may delete data on a rolling basis as the image buffer satisfies a data threshold.

Thus, using the radar data alone, the camera data alone, or a combination of the radar and camera data, the analysis module 122 may obtain data for accurate tracking of body segments and joint movement in order to extract input movement data to correlate with hit output.

In one embodiment, the inputs obtained by the MLM 102 and analyzed by the analysis module 122 may result in feedback provided to the player 106. The feedback may include information and statistics related to which physical movements the player 106 makes during various situations such as the type of shot (e.g., driving, chipping, putting), differences in how the weather affects movement (e.g., hot, cold, humid, windy), differences in altitude, differences in the time of day, etc. The information and statistics may provide an insight into which of the individual movements of combination of movements the player 106 makes that result in an array of different outcomes. From this data, the player 106 can make adjustments and continue to make improvements in the player's game. For example, if the player 106's follow through on a swing is consistent and results in hits that are classified as "good" a pre-determined percentage of the time, then the player 106 may continue to follow through in the same manner as previously. In another example, if the player 106 tends to slow down the speed of the swing as the club nears the ball, and such a motion results in hits that are classified as "bad" a pre-determined percentage of the time, then the player 106 may work on increasing the speed of the swing, or keeping the speed of the swing more consistent from beginning to end.

In one embodiment, multiple input events may be overlaid on one another so that the player 106 can visualize the similarities and differences between each input event. In an additional or alternative embodiment, multiple input events may be animated to provide the player 106 with a visualization as to how change the player 106's physical movements to improve the player 106's form. In an additional or alternative embodiment, the analysis module 122 may provide an "optimal" or "improved" model visualization for the player 106, based on the analysis performed on the player's kinematics and the correlation with each hit. The model visualization may be programmed to provide the player 106 with specific input on how to improve the player's form, and may use the player 106's actual input data to demonstrate to the player how to adjust his form to result in improved hits.

In an additional or alternative embodiment, the analysis determined by the MLM may be used to compare the movement of a professional in order to provide feedback on how to more closely mimic the movements of a professional and likely improve performance. In this embodiment, the movements by the player are obtained, analyzed, and compared to the movements made by a professional. For example, the analysis may determine that the player's upper body rotation is very close in motion and in speed to that of a professional, and thus, the feedback provided may indicate that the player should continue to move his upper body in the way that he has been. However, in another example, the analysis may determine that the player raises up off his heels before hitting the ball, which statistically results in a "bad" hit. In comparison with a professional golfer, it may be determined that the professional does not raise up on his heels to the same degree as the player, and that this raising-heel movement results in a "bad" hit by the player, whereas the professional's heel movement statistically results in a "good" hit. Therefore, the feedback provided to the player may be to work on limiting the motion of the heel.

As feedback is provided to the player, the analysis of the player based on the data obtained may change overtime. Thus, the feedback provided may be in real-time after a pre-determined number of data gathering sessions are made sufficient to provide an initial analysis. In one example embodiment, the pre-determined number of data gathering sessions obtained in order to provide an analysis may be 50; however, fewer or greater numbers of data gathering sessions may be used to provide an analysis.

In one embodiment, the MLM 102 may be in wired or wireless communication with a secondary display; for example, the MLM 102 may communicate with a monitor by way of communications over a Wi-Fi connection. The communications from the MLM 102 to the monitor may generate a frame buffer that includes one or more of an image, a video, replay content, previous player content, multi-player content, single player content, interactive content, entertainment, betting or gambling content, competition content, shot statistics, position data, target region data, environment data, and/or the analysis and feedback generated by the analysis module 122. The secondary display may be part of, or communicatively coupled to, a client device, a third-party device, a measuring device, a device proximate to an object launch area, a network-connected device, or any other suitable device.

Thus, the MLM 102 may be provided to and used for locations including driving ranges, batting cages, tennis courts, basketball courts, bowling alleys, or any environment where a player causes the movement of an object using the motion of the player 106's body.

In an additional or alternative embodiment, the MLM 102 may communicate with a cloud service over a wired or wireless connection. Communications with the cloud service may provide location information of the player 106 and request other players located within a pre-determined distance of the player 106 that may want to interact with the player 106. In another embodiment, the location of each player may not be relevant, however, the cloud service may store information on a number of players that would like to use their captured data and analysis to engage in a competition. Thus, in one embodiment, the data obtained over time may be used to participate in a gamified system.

Figure 3:
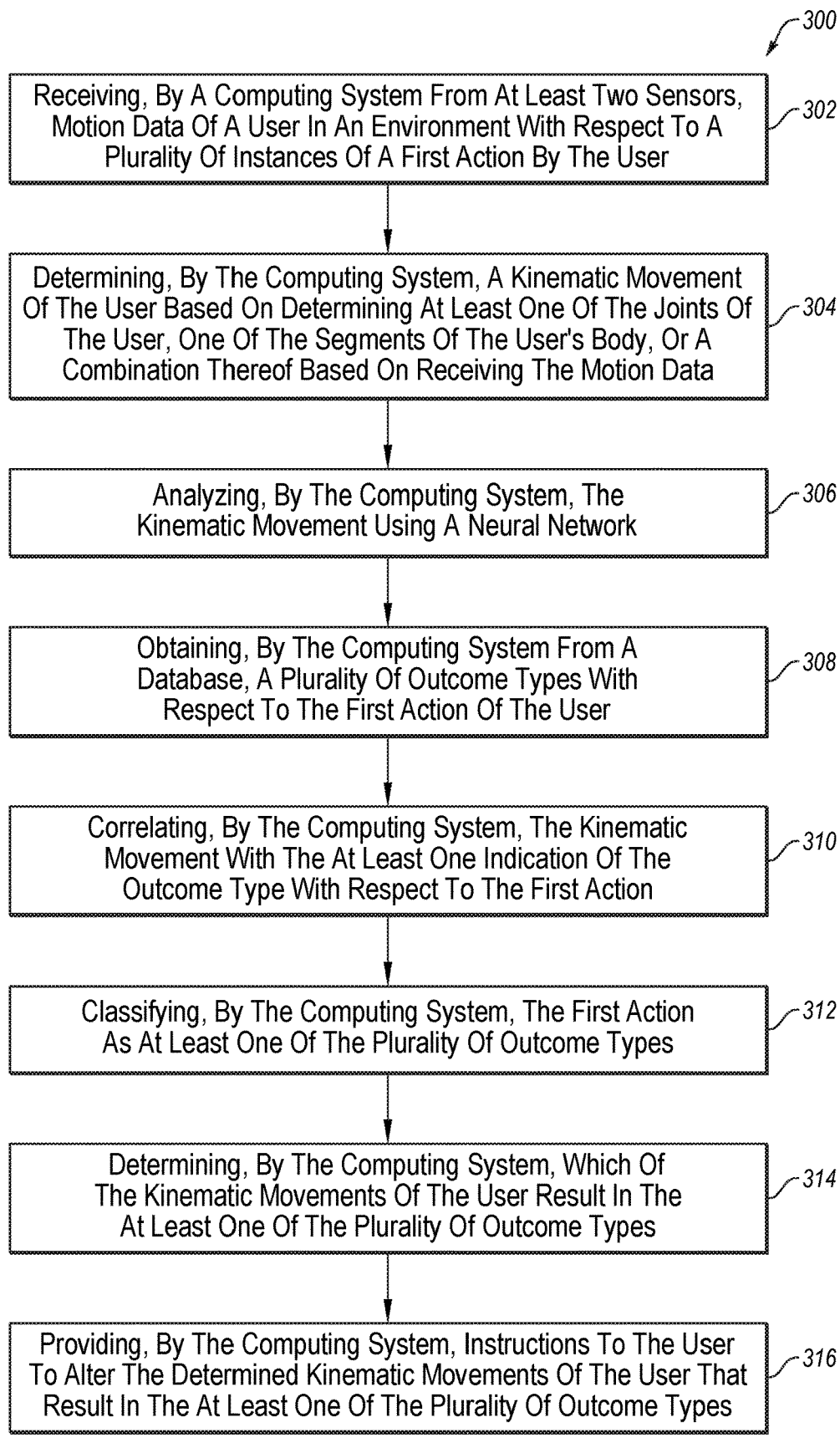
FIG. 3 illustrates an example method for a kinematic analysis of user form.

FIG. 3 illustrates an example method 300 of kinematic analysis of user form. The method 300 may be performed according to one or more embodiments described in the present disclosure. In these or other embodiments, the method 300 may be performed by processing logic that may include hardware (circuitry, dedicated logic, etc.), software (such as is run on a computer system), or a combination of both, which processing logic may be included in a client device, or another computer system or device. However, another system, or combination of systems, may be used to perform the method 300. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method may include, at action 302, receiving, by a computing system from at least two sensors, motion data of a user in an environment with respect to a plurality of instances of a first action by the user. For example, in one embodiment, the MLM 102 may be coupled to radar 118 and camera 120, and receive motion data of the player 106 as the player 106 engages in, e.g., swinging a golf club a number of times.

The method may include, at action 304, determining, by the computing system, a kinematic movement of the user based on determining at least one of the joints of the user, one of the segments of the user's body, or a combination thereof based on receiving the motion data. For example, in one embodiment, the motion data received in action 302 may be mapped onto a skeletal map 200 of the player 106 in order to determine how the joints and the body sections of the player 106 move in accordance to the motion data.

The method may include, at action 306, analyzing, by the computing system, the kinematic movement using a neural network. For example, a neural network may be trained on the motion data and/or the kinematic data over a plurality of repeated data captures (e.g., the player 106 swinging the club 50 times).

The method may include, at action 308, obtaining, by the computing system from a database, a plurality of outcome types with respect to the first action of the user. For example, the MLM 102 may obtain a map of all the golf courses, including terrain, yardage information, difficulty, etc., in order to determine what a "good" hit would be and what a "bad" hit would be.

The method may include, at action 310, correlating, by the computing system, the kinematic movement with the at least one indication of the outcome type with respect to the first action. For example, the analysis module 122 may determine which movements of the player 106 result in which type of outcome: a "good" hit or a "bad" hit.

The method may include, at action 312, classifying, by the computing system, an outcome of the first action as at least one of the plurality of outcome types. The method may include, at action 314, determining, by the computing system, which of the kinematic movements of the user result in the at least one of the plurality of outcome types. For example, the analysis module 122 may classify the movement of the player 106 to statistically produce a "bad" hit when teeing off on a par 4 golf hole.

The method may include, act action 316, providing, by the computing system, instructions to the user to alter the determined kinematic movements of the user that result in the at least one of the plurality of outcome types. For example, the MLM 102 may provide the player 106 with an overlay of the player's movement versus preferred movements to achieve a specific result. In another example embodiment, the player 106's movement may result in a good outcome, and thus the MLM 102 may provide instruction to continue the same body movements.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 4:
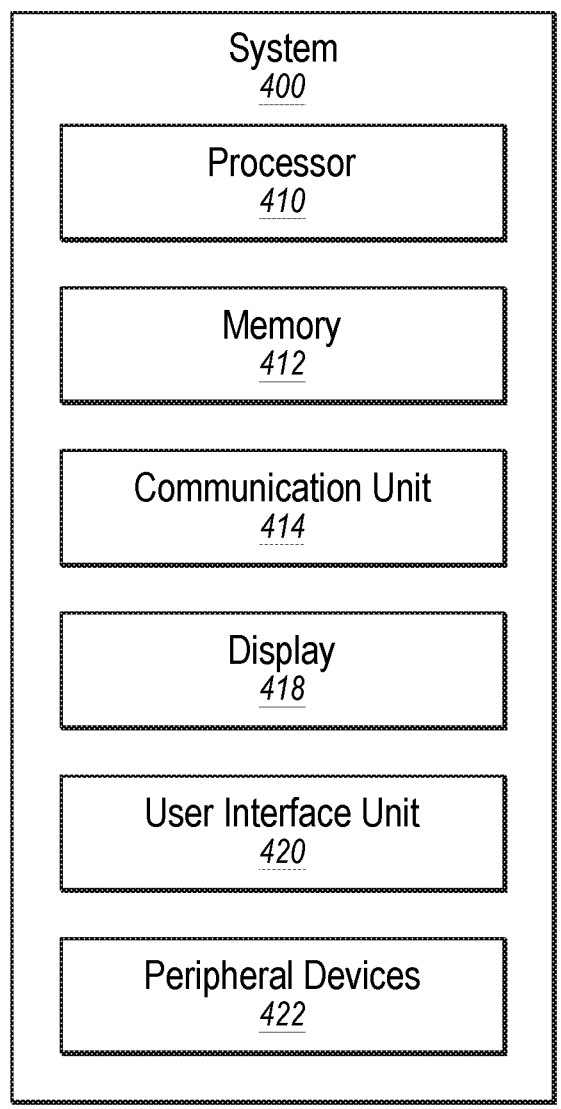
FIG. 4 illustrates a block diagram of an example computing system.

FIG. 4 illustrates an example computing system 400 that may be used in kinematic analysis of user form. The system 400 may be arranged in accordance with at least one embodiment described in the present disclosure. The system 400 may include a processor 410, memory 412, a communication unit 416, a display 418, a user interface unit 420, and a peripheral device 422, which all may be communicatively coupled. In some embodiments, the system 400 may be part of any of the systems or devices described in this disclosure. For example, the system 400 may be part of the MLM 102 of FIG. 1.

Generally, the processor 410 may include any computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 410 may include any number of processors distributed across any number of networks or physical locations that are configured to perform individually or collectively any number of operations described in this disclosure. In some embodiments, the processor 410 may interpret and/or execute program instructions and/or process data stored in the memory 412. In some embodiments, the processor 410 may execute the program instructions stored in the memory 412.

For example, in some embodiments, the processor 410 may execute program instructions stored in the memory 412 that are related to, for example, kinematic analysis of user form such that the system 400 may perform or direct the performance of the operations associated therewith as directed by the instructions. In these and other embodiments, instructions may be used to perform one or more operations of the method 300 of FIG. 3 described above.

The memory 412 may include computer-readable storage media or one or more computer-readable storage mediums for carrying or having computer-executable instructions or data structures stored thereon. Such computer-readable storage media may be any available media that may be accessed by a computer, such as the processor 410. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a computer. Combinations of the above may also be included within the scope of computer-readable storage media. Computer-executable instructions may include, for example, instructions and data configured to cause the processor 410 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuuten, 400 F.3d 1346 (Fed. Cir. 2007). Combinations of the above may also be included within the scope of computer-readable media.

The communication unit 416 may include any component, device, system, or combination thereof that is configured to transmit or receive information over a network. In some embodiments, the communication unit 416 may communicate with other devices at other locations, the same location, or even other components within the same system. For example, the communication unit 416 may include a modem, a network card (wireless or wired), an infrared communication device, a wireless communication device (such as an antenna), and/or chipset (such as a Bluetooth device, an 802.6 device (e.g., Metropolitan Area Network (MAN)), a Wi-Fi device, a WiMax device, cellular communication facilities, etc.), and/or the like. The communication unit 416 may permit data to be exchanged with a network and/or any other devices or systems described in the present disclosure.

The display 418 may be configured as one or more displays, like an LCD, LED, a monitor, a screen, or other type of display. The display 418 may be configured to image and video data of a player's movements, radar data, trajectory of an object, image and video data of other players, overlays, feedback, statistical analysis, user interfaces, and other data as directed by the processor 410.

The user interface unit 420 may include any device to allow a user to interface with the system 400. For example, the user interface unit 420 may include a mouse, a track pad, a keyboard, buttons, and/or a touchscreen, among other devices. The user interface unit 420 may receive input from a user and provide the input to the processor 410. In some embodiments, the user interface unit 420 and the display 418 may be combined. For example, a player may select, via the user interface unit 420, a specific joint or body part for which to receive more information, menu selections such as replays, slow motion replays, sped up replays, select profile and data of other players and/or professional players for which to receive a comparison, select a time frame over which the analysis should be done, etc.

The peripheral devices 422 may include one or more devices. For example, the peripheral devices may include a sensor, a microphone, and/or a speaker, among other peripheral devices. In these and other embodiments, the microphone may be configured to capture audio. The speaker may broadcast audio received by the system 400 or otherwise generated by the system 400. The sensor may be configured to sense changes in in light, pixels, sound, motion, rotation, position, orientation, magnetization, acceleration, tilt, vibration, force, speed, color, wind, etc.

Modifications, additions, or omissions may be made to the system 400 without departing from the scope of the present disclosure. For example, in some embodiments, the system 400 may include any number of other components that may not be explicitly illustrated or described. Further, depending on certain implementations, the system 400 may not include one or more of the components illustrated and described.

As indicated above, the embodiments described herein may include the use of a computer (e.g., a processor element) including various computer hardware or software modules. Further, as indicated above, embodiments described herein may be implemented using computer-readable media (e.g., a memory element) for carrying or having computer-executable instructions or data structures stored thereon.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
receiving, by a computing system from at least two sensors, motion data of a user in an environment with respect to a plurality of instances of an action by the user;
determining, by the computing system, a kinematic movement of the user based on determining at least one of a joint of the user, a body segment of the user's body, or a combination thereof based on the motion data;
analyzing, by the computing system, the kinematic movement using a neural network;
obtaining, by the computing system, from a database, a plurality of outcome types with respect to the action of the user;
correlating, by the computing system, the kinematic movement with at least one indication of an outcome type with respect to the action;
classifying, by the computing system, an outcome of the action as at least one of the plurality of outcome types;
determining, by the computing system, which of kinematic movements of the user that result in the at least one of the plurality of outcome types;
overlaying the determined kinematic movements with respect to the plurality of instances of the action on one another;
displaying, a visualization of the overlaid determined kinematic movements of the user with respect to the plurality of instances of the action by the user; and
providing, by the computing system, instructions to the user to alter the determined kinematic movements of the user that result in the at least one of the plurality of outcome types.

2. The method of claim 1, wherein receiving the motion data of the user in the environment comprises:
receiving image data from a camera coupled to the computing system;
receiving radar data from a radar device coupled to the computing system; and
identifying a kinematic movement of at least one of the joint of the user or the body segment of the user based on the image data and the radar data.

3. The method of claim 1, wherein receiving the motion data of the user in the environment comprises:
receiving the motion data from the at least two sensors placed at a pre-determined distance behind the user, the at least two sensors having a field of range that includes the body of the user.

4. The method of claim 1, wherein receiving the motion data of the user in the environment comprises:
receiving at least 50 instances of the action by the user in the environment.

5. The method of claim 1, wherein obtaining the indication of the outcome type with respect to the action comprises:
obtaining from a database, at least one indication of classifying the outcome of the action as: desired, good, accurate, not desired, poor, not accurate, and mediocre.

6. The method of claim 1, wherein:
receiving the motion data of the user in the environment comprises receiving the motion data of the user launching an object using the user's body; and
the method further comprises determining a flight parameter of the object during launch of the object based on the motion data, wherein:
the kinematic movements of the user that result in at least one of the plurality of the outcome types is based on the flight parameter of the object; and
the kinematic movement of at least one of the joint of the user or the body segment of the user is determined based on a Doppler effect of the motion data.

7. The method of claim 6, wherein receiving the motion data of the user launching the object using the user's body comprises:
receiving the motion data of the user engaging in at least one of: swinging a golf club, swinging a baseball bat, swinging a tennis racket, rolling a bowling ball, throwing a dart, pitching a baseball, and kicking a soccer ball.

8. The method of claim 1, wherein analyzing the kinematic movement using the neural network comprises:
obtaining a statistical analysis of the motion data by training the neural network using the determined kinematic movement of the user.

9. The method of claim 1, wherein providing the instructions to the user to alter the determined kinematic movements comprises:
displaying to the user, a visual display of the determined kinematic movements of the user with respect to the plurality of instances of the first action by the user and a display of a model kinematic movement.

10. A system, comprising:
one or more processors;
memory; and
one or more programs stored in the memory, the one or more programs comprising instructions to:
receive, from at least two sensors, motion data of a user in an environment with respect to a plurality of instances of an action by the user;
determine a kinematic movement of the user based on determining at least one of a joint of the user, a body segment of the user's body, or a combination thereof based on the motion data;
analyze the kinematic movement using a neural network;

obtain, from a database, a plurality of outcome types with respect to the action of the user;
correlate the kinematic movement with at least one indication of an outcome type with respect to the action;
classify an outcome of the action as at least one of the plurality of outcome types;
determine which of kinematic movements of the user that result in the at least one of the plurality of outcome types;
overlay the determined kinematic movements with respect to the plurality of instances of the action on one another;
display a visualization of the overlaid determined kinematic movements of the user with respect to the plurality of instances of the action by the user; and
provide instructions to the user to alter the determined kinematic movements of the user that result in the at least one of the plurality of outcome types.

11. The system of claim 10, wherein to receive the motion data of the user in the environment, the one or more programs comprise instructions to:
receive the motion data from the at least two sensors placed at a pre-determined distance behind the user, the at least two sensors having a field of range that includes the body of the user.

12. The system of claim 10, wherein to obtain the indication of the outcome type with respect to the first action, the one or more programs comprise instructions to:
obtain from a database, at least one indication of classifying the outcome of the action as: desired, good, accurate, not desired, poor, not accurate, and mediocre.

13. The system of claim 10, wherein:
to receive the motion data of the user in the environment, the one or more programs comprise instructions to receive the motion data of the user launching an object using the user's body;
the one or more programs further comprise instructions to determine a flight parameter of the object during launch of the object, wherein:
the kinematic movements of the user that result in at least one of the plurality of the outcome types is based on the flight parameter of the object; and
the kinematic movement of at least one of the joint of the user or the body segment of the user is determined based on a Doppler effect of the motion data.

14. The system of claim 10, wherein to receive the motion data of the user in the environment, the one or more programs comprise instructions to:
receive the motion data of the user engaging in at least one of: swinging a golf club, swinging a baseball bat, swinging a tennis racket, rolling a bowling ball, throwing a dart, pitching a baseball, and kicking a soccer ball.

15. The system of claim 10, wherein to analyze the kinematic movement using the neural network, the one or more programs comprise instructions to:
obtain a statistical analysis of the motion data by training the neural network using the determined kinematic movement of the user.

16. A non-transitory computer readable storage medium storing one or more programs for execution by one or more processors, the one or more programs comprising instructions to:
receive, from at least two sensors, motion data of a user in an environment with respect to a plurality of instances of an action by the user;
determine a kinematic movement of the user based on determining at least one of joints of the user, one of segments of the user's body, or a combination thereof based on the motion data;
analyze the kinematic movement using a neural network;
obtain, from a database, a plurality of outcome types with respect to the action of the user;
correlate the kinematic movement with at least one indication of an outcome type with respect to the action;
classify an outcome of the action as at least one of the plurality of outcome types;
determine which of kinematic movements of the user that result in the at least one of the plurality of outcome types;
overlay the determined kinematic movements with respect to the plurality of instances of the action on one another;
display a visualization of the overlaid determined kinematic movements of the user with respect to the plurality of instances of the action by the user; and
provide instructions to the user to alter the determined kinematic movements of the user that result in the at least one of the plurality of outcome types.

17. The non-transitory computer readable storage medium of claim 16, wherein to receive the motion data of the user in the environment, the one or more programs comprise instructions to:
receive the motion data from the at least two sensors placed at a pre-determined distance behind the user, the at least two sensors having a field of range that includes the body of the user.

18. The non-transitory computer readable storage medium of claim 16, wherein to receive the motion data of the user in the environment, the one or more programs comprise instructions to:
receive the motion data of the user engaging in at least one of: swinging a golf club, swinging a baseball bat, swinging a tennis racket, rolling a bowling ball, throwing a dart, pitching a baseball, and kicking a soccer ball.

19. The non-transitory computer readable storage medium of claim 16, wherein to analyze the kinematic movement using the neural network, the one or more programs comprise instructions to:
obtain a statistical analysis of the motion data by training the neural network using the determined kinematic movement of the user.

20. The non-transitory computer readable storage medium of claim 16, wherein to provide instructions to the user to alter the determined kinematic movements, the one or more programs comprise instructions to:
display to the user, a visual display of the determined kinematic movements of the user with respect to the plurality of instances of the first action by the user and a display of a model kinematic movement.

* * * * *